US009169993B2

(12) United States Patent
Finsterbusch (10) Patent No.: US 9,169,993 B2
(45) Date of Patent: Oct. 27, 2015

(54) LUMINOUS DEVICE (75) Inventor: Klaus Finsterbusch, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 13/982,762

(22) PCT Filed: Jan. 20, 2012

(86) PCT No.: PCT/EP2012/050868
§ 371 (c)(1),
(2), (4) Date: Jul. 31, 2013

(87) PCT Pub. No.: WO2012/104155
PCT Pub. Date: Aug. 9, 2012

(65) Prior Publication Data
US 2013/0314896 A1 Nov. 28, 2013

(30) Foreign Application Priority Data
Feb. 4, 2011 (DE) .......................... 10 2011 003 665

(51) Int. Cl.
*F21V 9/16* (2006.01)
*F21V 9/00* (2015.01)
*F21K 99/00* (2010.01)
*G03B 21/20* (2006.01)
(Continued)

(52) U.S. Cl.
CPC ... *F21V 9/00* (2013.01); *F21K 9/56* (2013.01); *F21S 48/1145* (2013.01); *G03B 21/204* (2013.01); *F21Y 2101/02* (2013.01); *F21Y 2113/002* (2013.01)

(58) Field of Classification Search
CPC .......... F21V 9/00; F21K 9/56; F21Y 2101/02
USPC ........ 362/231, 84, 285, 33, 35; 359/889, 885; 353/20, 31
See application file for complete search history.

(56) References Cited

U.S. PATENT DOCUMENTS 7,547,114 B2 * 6/2009 Li et al. .......................... 362/231
8,403,493 B2 * 3/2013 Ogawa et al. ................... 353/31
(Continued)

FOREIGN PATENT DOCUMENTS

CN 1396478 A 2/2003
CN 101283217 A 10/2008
(Continued)

OTHER PUBLICATIONS

International Search Report of PCT/EP2012/050868 dated Jun. 27, 2012.
(Continued)

*Primary Examiner* — Ali Alavi (57) ABSTRACT

A luminous device with at least one rotatable luminous region carrier having at least two luminous regions and a first light source and a second light source, each for irradiating at least one part of the luminous regions, is disclosed. The first light source and the second light source of the luminous device emit light of different colors and at least one of the luminous regions is a phosphor which can be irradiated by the light from the first light source and can reemit said light in an at least partly wavelength-converted fashion. At least one of the luminous regions of the luminous device can be irradiated by the light from the second light source and that light is scattered by the luminous region without wavelength conversion.

18 Claims, 3 Drawing Sheets

(51) Int. Cl.
*F21S 8/10* (2006.01)
*F21Y 101/02* (2006.01)
*F21Y 113/00* (2006.01)

(56) References Cited

U.S. PATENT DOCUMENTS

| | | | |
|---|---|---|---|
| 8,416,832 B2* | 4/2013 | Weichmann et al. | 372/106 |
| 8,469,520 B2* | 6/2013 | Maeda | 353/31 |
| 8,740,406 B2* | 6/2014 | Yang et al. | 362/231 |
| 8,789,957 B2* | 7/2014 | Yang et al. | 362/84 |
| 2009/0103293 A1 | 4/2009 | Harbers et al. | |
| 2009/0284148 A1 | 11/2009 | Iwanaga | |
| 2010/0097779 A1 | 4/2010 | Gladnick et al. | |
| 2012/0120120 A1 | 5/2012 | Li et al. | |
| 2012/0128023 A1* | 5/2012 | Weichmann et al. | 372/106 |
| 2013/0027436 A1* | 1/2013 | Yang | 345/690 |
| 2013/0038847 A1* | 2/2013 | Katou | 353/98 |
| 2013/0050981 A1* | 2/2013 | Yang et al. | 362/84 |

FOREIGN PATENT DOCUMENTS

| | | |
|---|---|---|
| CN | 101329018 A | 12/2008 |
| CN | 101858496 A | 10/2010 |
| WO | 2007042962 A1 | 4/2007 |
| WO | 2007141688 A1 | 12/2007 |
| WO | 2009112961 A1 | 9/2009 |

OTHER PUBLICATIONS

German Office Action of 10 2011 003 665.2 dated Oct. 6, 2011.
Office Action received from Chinese Patent Application 201280007622.6, mailed on Nov. 3, 2014, 8 pages of Office Action and 8 pages of English translation.

* cited by examiner

LUMINOUS DEVICE

RELATED APPLICATIONS

The present application is a national stage entry according to 35 U.S,C. §371 of PCT application No.: PCT/EP2012/050868 filed on Jan. 20, 2012, which claims priority from German application 10 2011 003 655.2, filed on Feb. 4, 2011.

Technical Field

WO 2009/112961 A1 describes a laser light source which includes at least one element emitting laser light, at least one light source exit element (which is adapted to direct the laser light onto a predetermined position) and at least one conversion element. The at least one conversion element includes a set of wavelength conversion regions, which are adapted to wavelength-convert the laser light so that a combination of the converted light and the laser light produces a desired output of mixed light.

Background

The present disclosure provides an improved luminous device for producing mixed light from light of a plurality of wavelengths by using wavelength conversion, which in particular can be produced economically and has stable luminous properties, and the overall color locus of the mixed light of which can be adjusted simply and precisely.

The present disclosure provides a luminous device which comprises at least a rotatable luminous region carrier having at least two luminous regions, and at least a first light source and a second light source for respectively illuminating at least one part of the luminous regions, wherein the first light source and the second light source emit light of different colors, at least one of the luminous regions comprises a luminous material which can be illuminated by the light of the first light source and re-emits this light at least partially wavelength-converted, and at least one of the luminous regions can be illuminated by the light of the second light source, and this at least one luminous region emits the light of the second light source without wavelength conversion.

This luminous device has the advantage that, by the use of the wavelength conversion by at least one of the light sources, a simpler and more economical production of light of a further color, namely the wavelength-converted color, is possible than only with light from light sources (i.e. without any use of wavelength conversion). On the other hand, use of at least one light source without downstream wavelength conversion is advantageous in comparison with use of only one light source and wavelength conversion thereof, optionally into a plurality of colors, for simpler and more precise adjustment of an overall color locus of the mixed light emitted by the luminous device. Furthermore, thermal stress of the luminous region carrier due to Stokes losses during the wavelength conversion can be reduced, which reduces thermally generated shifts of a wavelength of wavelength-converted light as well as a degree of "thermal quenching", and prevents thermally induced degradation of the luminous material. This permits short- and long-term stable luminous properties. That at least one of the luminous regions can be illuminated by the light of the second light source, and this at least one luminous region emits the light of the second light source without wavelength conversion, thus in particular means that the light of the second light source is not wavelength-converted.

A luminous region may in particular be understood as a region, on the rotating luminous region carrier, which can be illuminated by at least one of the light sources and which emits (secondary) light as a result of the (primary) light itself incident on it.

Light of different colors may, in particular, be understood as different light with a different peak wavelength and/or a different bandwidth or band distribution, as well as presence of different spectral bands.

It is one refinement that at least one luminous region which can be illuminated by the light of the second light source scatters, or emits in a scattering fashion, the light of the second light source without wavelength conversion. Particularly in the case of a narrow-emitting light source (the light beam of which has a relatively small aperture angle), preferably a laser light source, this permits beam expansion in a simple way.

It is an alternative or additional refinement that at least one luminous region which can be illuminated by the light of the second light source is transparent for the light of the second light source without wavelength conversion, at least for the light of the second light source. Particularly in the case of a wide-emitting light source (the light beam of which has a relatively large aperture angle), preferably a light-emitting diode, this permits low light losses at the luminous region during transmission.

It is one refinement that the luminous region diffusely emits (secondary) light.

The light emitted by the luminous region may have the same wavelength as the incident light. In this case, the luminous region is used (only) as a diffuser for the incident light ("diffuser region").

The light emitted by the luminous region may, however, also at least partially have a different wavelength than the incident light. The incident light is thus in this case wavelength-converted at the luminous region. For the wavelength conversion, the luminous region preferably includes one or more luminous materials ("luminous material region").

The luminous material region may, in particular, include a luminous material layer. A luminous material layer of the luminous material region may be adjustable in a controlled way in relation to its thickness and/or a concentration of the at least one luminous material, in such a way that a wavelength-converted fraction may consequently also be adjusted in a controlled way. In particular, the incident light may be wavelength-converted essentially fully by virtue of a sufficiently high luminous material concentration and/or a sufficiently large thickness. This may, in particular, correspond to a conversion factor of at least about 95%, in particular of at least about 98%, in particular of at least about 99%.

The wavelength conversion may for example be carried out on the basis of luminescence, in particular photoluminescence or radioluminescence, in particular phosphorescence and/or fluorescence.

The light wavelength-converted by the at least one luminous material may in particular be re-emitted diffusely, which permits high intensity homogeneity and wide illumination of an optical element optionally arranged downstream.

If a plurality of luminous materials are provided, an incident light beam may be converted at least partially into light of different wavelengths. That the luminous material region, or its luminous material, is capable of at least partially wavelength-converting light emitted by the light source may, in particular, mean that a part of the light shone by the light source onto the luminous material region is absorbed by at least one luminous material of the luminous material region and re-emitted with a modified, preferably longer ("down-converting") or shorter ("up-converting") wavelength (for example from blue to yellow). Another part of the light may be re-emitted by the luminous material region without conversion of the wavelength. In this way, monochromatic light shone in by the associated light source may be emitted by the luminous material region as mixed light (as a combination of the wavelength-converted fraction and the non-wavelength-converted fraction).

A luminous region may respectively be used as a luminous material region for incident light of different wavelengths. Alternatively, a luminous region may be used as a luminous material region for incident light of a first wavelength and may be used for incident light of a second, different wavelength as a diffuser region, in which the luminous material acts (only) as diffuser material.

With the present luminous device, it is possible in particular for the first light source to light or illuminate at least one luminous material region and for the second light source not to illuminate any luminous material region, or only at least one diffuser region.

In one particularly simple refinement, the luminous device includes precisely one luminous material region, which may be illuminated by the light of the first light source and re-emits this light (in particular diffusely) partially wavelength-converted. Furthermore, a luminous region acting as a diffuser region for the light of the second light source may be illuminated by the light of the second light source. The two luminous regions may be different luminous regions or the same luminous region. Overall, mixed light which includes three different wavelengths, namely the respective non-wavelength-converted, or wavelength-invariant light and the wavelength-converted light may thus be produced by means of the two light sources. In this case, the relative fraction of the wavelength-invariant and wavelength-converted light produced by the first light source are predetermined essentially by the luminous (material) region (for example concentration of the luminous material and thickness of a luminous material layer). For example, the first light source may emit blue (primary) light which is partially converted into green light at a luminous material region. The second light source may emit red light onto a luminous region acting as a diffuser region therefor, so that the resulting mixed light emitted by the luminous device may be light generated by RGB mixing, for example white light. Alternatively, the first light source may for example emit UV light onto two different luminous materials (which are arranged on two different luminous material regions or are present as a mixture in a common luminous material region), which for example carry out wavelength conversion of UV light into blue light or into green light.

The light sources are preferably narrow-band, preferably monochromatic or quasi-monochromatic light sources having a small bandwidth, preferably laser-like light sources.

At least one light source which includes one or more lasers or laser light sources is preferred. A luminous device configured in such a way may also be referred to as a LARP ("Laser Activated Remote Phosphor") device. The laser light source may in particular include at least one semiconductor laser, preferably a diode laser or laser diode. These can be configured particularly compactly and robustly. Laser diodes may also be operated simply together in groups, for example as a stack ("laser stack").

Alternatively, the at least one light source may, for example, include one or more light-emitting diodes. The at least one light-emitting diode may be provided in the form of at least one individually packaged light-emitting diode or in the form of at least one LED chip. A plurality of LED chips may also be mounted on a common substrate ("submount"). The at least one light-emitting diode may be equipped with at least one optical unit of its own and/or common optical unit for beam guiding, for example at least one Fresnel lens, collimator, or the like. Instead of or in addition to inorganic light-emitting diodes, for example based on InGaN or AlInGaP, organic LEDs (OLEDs, for example polymer OLEDs) are also generally usable.

The at least one light source may furthermore include at least one broadband light source, downstream of which at least one optical filter is arranged.

Light of a different color includes, in particular, light of a different peak wavelength and/or a different bandwidth.

While the light beam respectively emitted by the light sources is spatially stationary and respectively produces an essentially spatially stationary light spot on the rotatable luminous region carrier, the luminous region carrier rotates under the incident light during operation. The light spots thus (at least in continuous operation) illuminate an annular region on the luminous region carrier. Within this annular region, the luminous regions may in particular be in the form of ring segments.

It is yet another refinement that a plurality of luminous material regions are arranged segmentally on the luminous region carrier. During rotational of operation of the luminous region carrier, different luminous regions may thus be illuminated successively by a light source, and a sequential light sequence, in particular color sequence, composed of the light emitted by luminous regions can consequently be produced. Owing to inertia of the human eye, with a sufficiently high rotational speed of the color wheel (for example more than 25 revolutions per second) the sequential light sequence is perceived as mixed light.

It is one configuration that the light of the first light source is scattered on at least one of the luminous regions without wavelength conversion. This may, in particular, be implemented in such a way that the at least two different luminous regions are illuminated by the first light source, of which one acts as a diffuser region for the light of the first light source (and the other as a luminous material region). The luminous regions may, for example, correspond to different segments on the luminous region carrier. In particular, the luminous material region illuminated by the first light source may have a high conversion factor of, for example, 95% or more. The use of a diffuser region for the first light source as well increases the possible gamut of the mixed light in a simple way.

It is also a configuration that the light of the light sources is shone onto the same side of the luminous region carrier. In this way, the luminous region carrier can be configured particularly simply. This also permits effective use of an optical unit, arranged downstream of the luminous region carrier, which is only provided in a half-space present on the illuminated side of the luminous region carrier, for example a half-dish reflector. A luminous device design which is particularly compact in relation to its size is also provided.

It is a special configuration that at least one of the luminous regions is a luminous region which is diffusely reflective for the light of the second light source. This at least one luminous region may be without luminous material, or may include a luminous material responsive to the light of the first light source but not of the second light source.

It is also a configuration that the light of the two light sources is shone onto different sides of the luminous region carrier, and wherein at least one of the luminous regions is a luminous region which is optically transmissive (scattering/translucent or transparent) for the light of the second light source. The luminous region which is optically transmissive for the light of the second light source may for example be an optically transmissive diffuser plate or diffuser film, particularly when a narrow-emitting second light source is being used. Illumination from different sides offers the advantage that the light sources can be arranged at a significant distance from one another, particularly in the case of separate incidence of the light produced by them onto the luminous region carrier.

It is also a configuration that the luminous region which is optically transmissive for the light of the second light source is a luminous region which wavelength-converts the light of the first light source. This permits a particularly compact luminous region carrier. This luminous region may be provided both for the case in which the light of the two light sources is shone onto the same side of the luminous region carrier, and for the case in which the light of the two light sources is shone onto different sides of the luminous region carrier. If the light of the two light sources is shone onto different sides of the luminous region carrier, the thickness of the luminous region, or of an associated luminous material layer, may in particular be limited to values for which the luminous region is optically transmissive for the light of the second light source.

Particularly if the light of the two light sources is shone onto different sides of the luminous region carrier, and at least one of the luminous regions is a luminous region which is optically transmissive for the light of the second light source, it may be preferred that a mirror which is transmissive, for example dichroic, for the light coming from the second light source is arranged in a light path between the second light source and the luminous region which is optically transmissive for the light of the second light source. Conversely, light of the first light source incident on the dichroic mirror in the opposite direction is reflected back (into the luminous region). In this way, a light loss of the light of the first light source can be effectively prevented essentially while keeping the installation height the same. A light loss of the light of the second light source by reflection back downward (into a lower (half-) space, from which the second light source shines into the luminous region carrier) may, for example, be limited by a scattering disk essentially radiating upward (into an upper half-space). A light loss of the second light source can be reduced further by using an angle-sensitive reflector, in the case of which the light incident from below is shone in at an angle for which the reflector is transmissive (for example with normal incidence), while the reflector acts reflectively for non-perpendicularly incident light (for example light scattered diffusely at the luminous region).

For the case in which the luminous region which is optically transmissive for the light of the second light source is a luminous region which (can be illuminated and) wavelength-converts the light of the first source, it is a preferred configuration that the dichroic mirror is reflective for light which is emitted by this luminous region, that is to say besides for the light of the second light source, also both for the non-wavelength converted and for the wavelength-converted light of the first light source.

It is furthermore a configuration that at least one of the light sources can be operated in a cycled manner adapted to an angular position of the luminous region carrier. In this way, the light of the light sources can be restricted to desired regions or sections of a luminous region carrier. This firstly permits controlled adjustment of a luminous duration and therefore brightness of a particular luminous region. In this way, for example, an overall color locus of the mixed light can be varied in a simple way. Secondly, it also permits an arrangement of the luminous region only to be illuminated by the first light source at a position which can also be illuminated by the second light source, for example by corresponding switching off of the second light source, or vice versa. A particularly compact configuration of the luminous region carrier is achieved in this way. In particular, an arrangement of the luminous regions to be illuminated only by the first light source and/or only by the second light source as segments of the same ring on the luminous region carrier is possible. Thirdly, compared with continuous operation of the light sources, an energy-saving and longer-lasting luminous device which generates less heat can be provided. Fourthly, compact light guiding of the light sources via at least partially the same optical elements, or at least partially the same optical path, to the luminous region carrier is made possible. Particularly in this case, the surfaces, preferably annular regions, which can be illuminated by the light sources on the luminous region carrier can at least essentially be the same.

It is also a configuration that the at least two luminous regions are divided between at least two (different) concentric annular regions on the luminous region carrier. In this way, the annular regions can be illuminated by different light sources in a simple way. The surfaces which can be illuminated by the light sources on the luminous region carrier are consequently not the same, and preferably also not overlapping. This configuration permits high brightness together with a compact design.

It is furthermore a configuration that the light of the second light source includes or is red light. Since red light has the longest wavelength in the visible light spectrum, the greatest Stokes losses (which increase with an increasing wavelength difference of the wavelength conversion), during wavelength conversion which is otherwise to be carried out, can be avoided thereby and a significantly less thermally stressed luminous device can be provided.

It is furthermore a configuration that the light of the second light source includes or is light and/or ultraviolet light. Thus, light can be provided in a simple way over essentially the entire visible light spectrum, and in particular by wavelength conversion toward longer wavelengths (down conversion), for example from blue or UV to green.

It is a particularly advantageous configuration that the light of the first light source includes or is blue light (for example with a peak wavelength of about 445 nm or with a peak wavelength in the range of between 460 nm and 470 nm) and/or ultraviolet light, and the light of the second light source includes or is red light. In this way, a large gamut can be provided with relatively little heat generation by Stokes losses. The high Stokes losses otherwise occurring owing to wavelength conversion from UV or blue to red are avoided.

It is another configuration that the luminous device includes at least one optical element, preferably reflector, arranged optically downstream of the luminous region carrier.

It is also another configuration that the luminous device includes at least one reflector arranged optically downstream of the luminous region carrier and a light emission surface, produced by the light sources, of the luminous regions, is located in or at a focal point of the at least one reflector. In this way, particular uniform (chromatically and/or in terms of brightness) light emission from the luminous device can be achieved. As an alternative or in addition to the reflector, at least one further optical unit or optical element may be arranged downstream of the luminous region carrier, for example a light mixing rod (for example a total internal reflection light rod, TIR rod), a condenser (in particular fly's eye condenser,) and/or a lens etc.

It is a special configuration that the at least one reflector includes at least one half-dish reflector or is one. This may, for example, be used particularly advantageously in automobile applications. A luminous device including a half-dish reflector generally has a particularly small installation height. Nevertheless, it is also possible to use a full-dish reflector or another reflector.

It is also a configuration that the at least one reflector (segmented reflector) has a plurality of focal points, and that light emission surfaces (light spots), produced by different light sources, of the luminous regions are located in or at different focal points of the at least one reflector. In this way, uniform light emission from the luminous device can also be achieved for a plurality of positionally separated light emission surfaces. This may be advantageous in particular for the case in which the at least two luminous regions are divided between at least two concentric annular regions on the luminous region carrier, in which case, in particular, a respective light source is then assigned to each of the focal points.

As an alternative, in particular to the provision of a plurality of focal points, the focal point may be a two-dimensionally or spatially extended focal point or focal spot, to which in particular a plurality of positionally separated light emission surfaces may be assigned.

The disclosure will be schematically explained in more detail in the following figures with the aid of exemplary embodiments. For the sake of clarity, elements which are the same or have the same effect may be provided with the same references.

DETAILED DESCRIPTION

Figure 1:
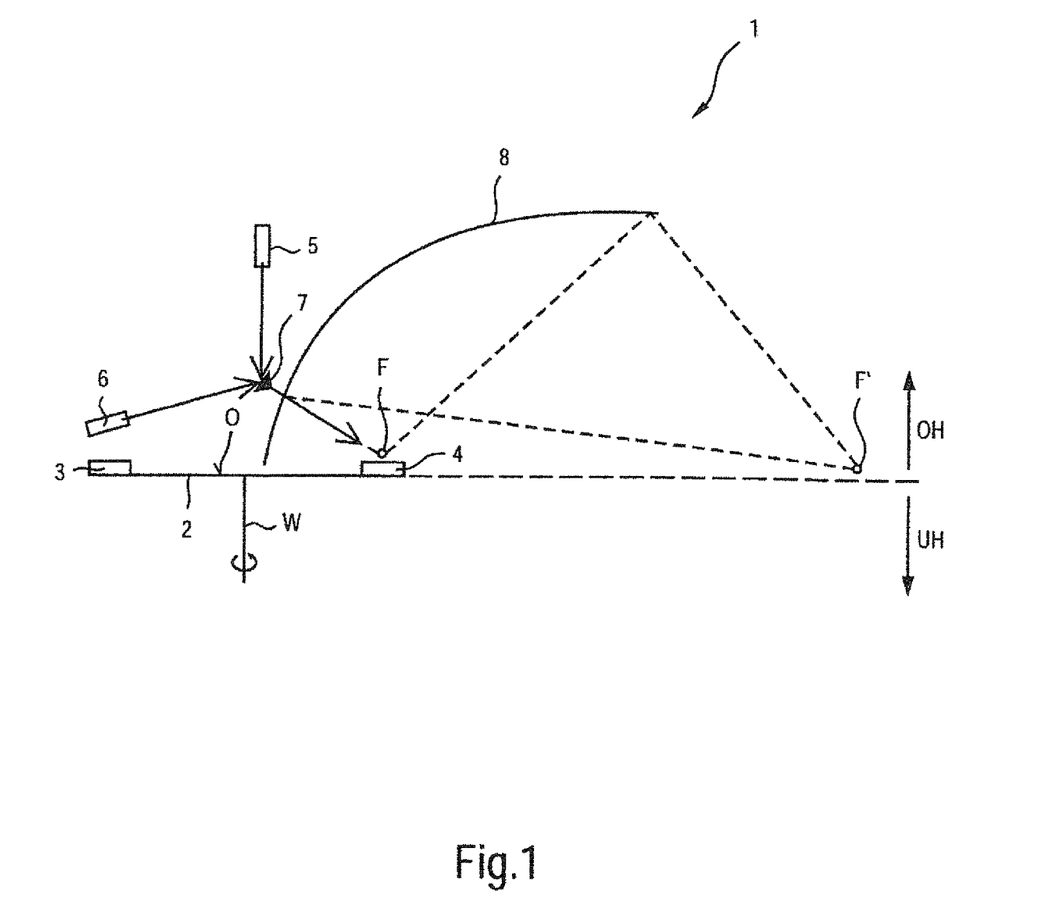
FIG. 1 shows a luminous device according to a first embodiment, including a rotatable luminous region carrier, as a sectional representation in side view.
Figure 2:
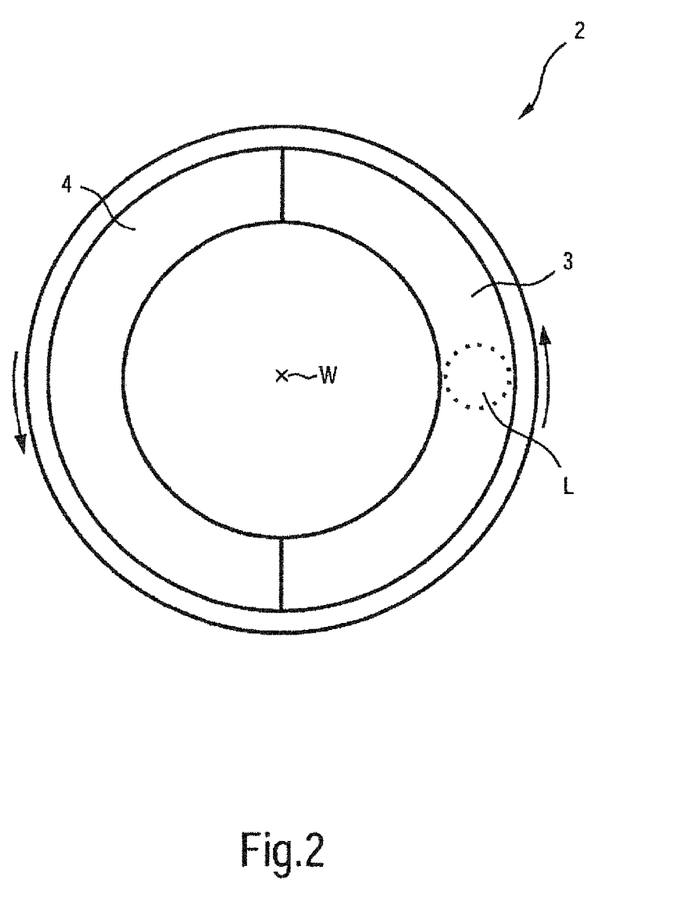
FIG. 2 shows a possible embodiment of the luminous region carrier in plan view.

FIG. 1 shows, as a sectional representation in side view, a luminous device 1 including a luminous region carrier 2 which can be rotated about a rotation axis W, as indicated by the curved arrow. FIG. 2 shows a possible embodiment of the luminous region carrier 2 in plan view.

The luminous region carrier 2 includes two luminous regions 3 and 4, which are formed as adjacent ring segments on a ring concentric with the rotation axis W. The luminous device 1 furthermore includes a first light source in the form of a first laser light source 5 for illuminating the two luminous regions 3 and 4, as well as a second light source in the form of a second laser light source 6 for respectively illuminating only the luminous region 4, both of which illuminate an upper side O of the luminous region carrier 2. The first laser light source 5 emits blue light, and the second laser light source 6 emits red light. The light of the laser light sources 5, 6 is combined at a beam combiner 7 and then shone onto the luminous region carrier 2 along a common optical path, as indicated by the straight arrows.

In principle, illumination of the entire concentric ring, formed by the luminous regions 3 and 4, by both the laser light sources 5, 6 is possible in this way (with continuous-wave operation of the laser light sources 5, 6). However, the laser light sources 5 and 6 can be operated in a cycled fashion (with adjustable on and off phases, or beam and dark phases), so that it is possible to adjust a path of a light spot L produced by the light (which results from the rotation of the luminous region carrier 2 under the respective light beam) and therefore also an illumination duration on the luminous regions 3 and 4.

The luminous region 3 is in this case covered with a luminous material layer, which converts the blue light of the first laser light source 5 with a high conversion factor, for example more than 95%, into green light (by down conversion). The green light is then scattered into an upper half-space OH above the illuminated upper side O of the luminous region carrier 2. The luminous region 3 is thus used as a luminous material region for the first laser light source 5.

The luminous region 4 includes a light-scattering material which is applied onto a reflective base and can scatter both the blue light of the first laser light source 5 and the red light of the second laser light source 6 without wavelength conversion into the upper half-space OH. The luminous region 3 is thus used as a diffuser region for the first laser light source 5 and for the second laser light source 6.

The first laser light source 5 can be in a cycled manner adapted to an angular position of the luminous region carrier 2 in such a way that it can shine its blue light both onto the luminous region (luminous material region) 3 and onto the luminous region (diffuser region) 4. The second laser light source 6 on the other hand, is cycled in such a way that it shines its red light only onto the luminous region (diffuser region) 4. By the rotation of the luminous region carrier 2, the luminous regions 3 and 4 are illuminated sequentially, in which case the luminous region (diffuser region) 4 may be illuminated simultaneously by both laser light sources 5, 6.

By corresponding adjustment of the cycling, a particular color coordinate in a gamut spanned by the color fractions of the mixed light can be adjusted, and by variation of the cycling and therefore of the relative color component of the overall color locus, a mixed light produced by the luminous region carrier 2 can be adjusted flexibly within this gamut.

A reflector 8, here in the form of a half-dish reflector, is arranged optically downstream of the luminous region carrier 2. The reflector 8 covers a part of the illuminated side of the luminous region carrier 2, including the region, or light spot L, illuminated by the laser light sources 5 and 6, and is consequently positioned in the upper half-space OH. In the reflector 8, there is an opening (not shown) through which the combined light path for the first light source 5 and the second light source 6 enters inside the reflector 8 and can illuminate the luminous regions 3 and 4 therein, respectively. The luminous region carrier 2 is arranged partially outside the reflector 8, which facilitates positioning of a drive motor for the rotation axis W and cooling of the luminous region carrier 2.

A focal point F of the reflector 8 lies in or in the vicinity of a light emission surface or light spot L produced by the light of the laser light sources 5 and 6 on the luminous region carrier 2, or its luminous regions 3 and 4. With a light sequence carried out rapidly enough, for example with rotation of the luminous region carrier 2 of at least 25 revolutions per second, the light emitted by the reflector 8 is perceived as mixed light having red, green and blue color components.

The luminous device 1 has, inter alia, the advantage that the mixed light can be produced with a high degree of uniformity both chromatically and in terms of its brightness. Furthermore, this luminous device 1 is more economical and more compact than when producing the mixed light from a blue laser light source, a green laser light source and a red laser light source. Furthermore, thermal stress of the luminous region carrier 2 is reduced compared with use of only one (in particular blue) laser light source and two luminous materials, for example for blue-green and blue-red wavelength conversion, by avoiding the particularly high Stokes losses during the blue-red wavelength conversion.

In an alternative refinement, the luminous device includes three luminous regions, of which one corresponds to the luminous region 3, one is used for the scattering (without wavelength conversion) of the blue light and one is used for the scattering (without wavelength conversion) of the red light. The second luminous region 4 has thus been divided into two different luminous regions, so that the diffuser material can be adapted better to the incident wavelength.

Particularly if the luminous material, or the luminous material region 3, acts as a diffuser region for the red light of the second laser light source 6 and furthermore the blue light is not fully wavelength-converted (for example with a fraction of less than 95%), in a further alternative it is even possible for there to be only the luminous region 3, for example in full annular form. The luminous region (luminous material region for the blue light and diffuser region for the red light) 3 is consequently illuminated both by the first laser light source 5 and by the second laser light source 6. In this case, a relative fraction of the blue light and of the green light is essentially predetermined. A color locus may, for example, be varied by adjustment of cycling of the second laser light source 6, or of the red light.

In general, the luminous material region 3 may include two or more luminous materials which respond to the blue light of the first light source 5 and convert the blue light into light of a different wavelength. Nevertheless, two or more spatially separated luminous regions may also be used for the blue light, these two or more luminous regions including different luminous materials (this prevents mutual influence of the luminous materials during the wavelength conversion). This arrangement is furthermore particularly advantageous if the first light source does not emit any visible light, but instead for example UV light. Then, two luminous materials may convert the UV light into blue or green light, for example. In general, the colors of the laser light sources and of the wavelength-converted light are not restricted.

Figure 3:
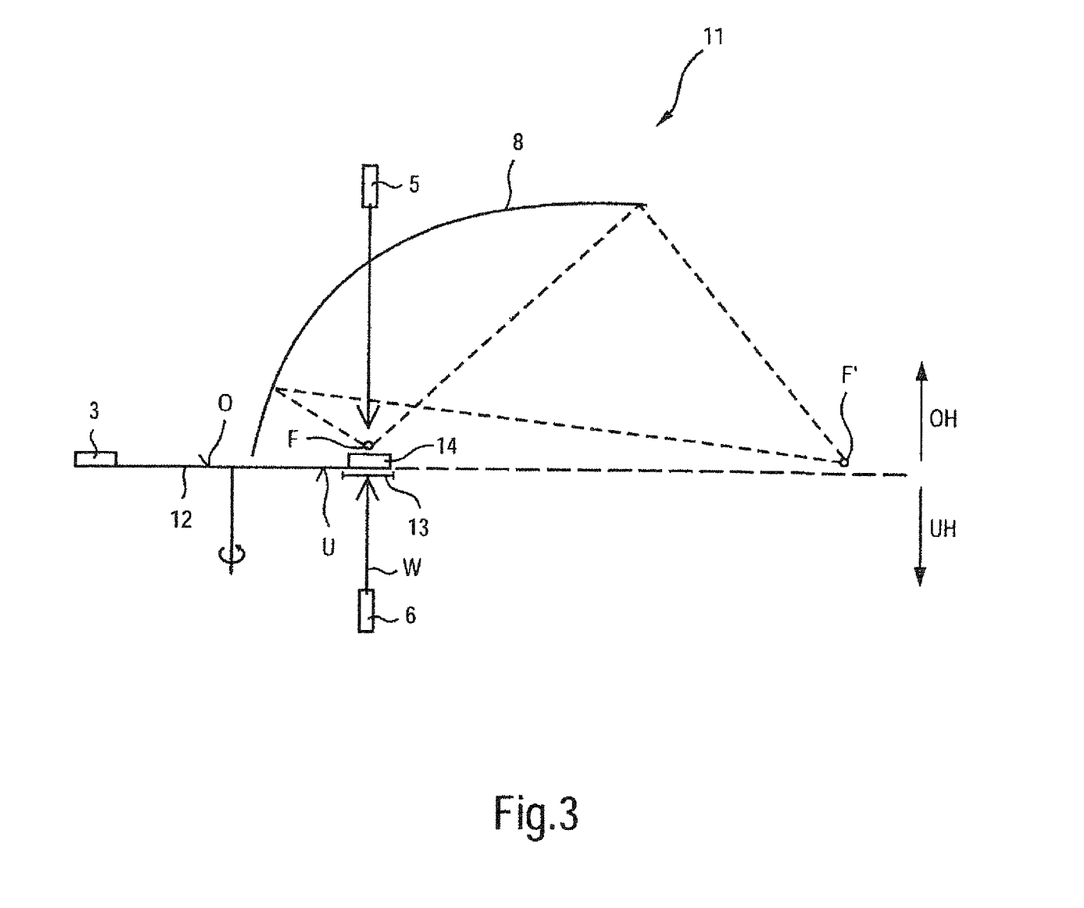
FIG. 3 shows a luminous device according to a second embodiment, including a rotatable luminous region carrier, as a sectional representation in side view.

FIG. 3 shows a luminous device 11, including a rotatable luminous region carrier 12, as a sectional representation in side view. The luminous device 11 is constructed in a similar way to the luminous device 1, differences being discussed in more detail below.

In contrast to the luminous device 1, the light of the laser light sources 5, 6 is shone onto different sides of the luminous region carrier 12, or the associated luminous regions 3, 14, namely blue light from the first laser light source 5 onto the upper side O (from above) of the luminous region carrier 12, or onto the luminous regions 3 and/or 14, and red light from the second laser light source 6 onto the lower side U (from below), or onto the luminous region 14. The luminous region 14 corresponds similarly to the luminous region 4 of the luminous device 1. So that the light subsequently emitted by the luminous region carrier 12 is also emitted only essentially from the upper side O, that is to say in particular into the upper half-space OH, the luminous region 14 illuminated by the second laser light source 6 is optically transmissive at least for the red light of the second laser light source 6. To this end, the second luminous region 14 may, for example, include a sufficiently thin diffuser plate or a diffuser film.

In principle, the second luminous region 14 will also scatter the incident red light back into the lower half-space complementary to the upper half-space OH, i.e. the second luminous region 14 of the luminous region carrier 12 also emits downward in a scattering fashion. So that the red light of the second laser light source 6 enters the upper half-space OH as fully as possible, a mirror 13 which is essentially transmissive for the red light coming from the second light source 4 is arranged in a light path between the second laser light source 6 and the second luminous region 14. The effect of this is that red light coming from the second light source 6, for example perpendicularly, from below is transmitted to the second luminous region 14 and light scattered downward, for example non-perpendicularly, in the opposite direction by the second luminous region 14 is reflected back into the second luminous region 14. For maximally complete reflection back into the second luminous region 14, the mirror 13 directly adjoins the diffuser plate or diffuser film.

In order to prevent transmission or scattering of the blue light of the first laser light source 5, incident from above on the luminous region 14, into the lower half-space UH, the mirror 13 is furthermore configured as a dichroic mirror 13 which is reflective for the blue light coming from the luminous region 14.

Alternatively, the luminous device 11 may be varied in a similar way to the luminous device 1. For example, the (second) luminous region used as an optically transmissive diffuser region for the red light incident from below may act as a luminous material region for the blue light incident from above, for example by the luminous material responding to the blue light simultaneously acting as a diffuser material for thered light. In other words, the luminous region which is optically transmissive for the light of the second laser light source is then also a luminous region which wavelength-converts the light of the first laser light source.

The present invention is not, of course, restricted to the exemplary embodiments presented.

For instance, more than two light sources of different colors may also be used in a similar way, for example two or more light sources of different colors, the light of which is at least partially wavelength-converted, and/or two or more light sources of different colors, the light of which is not wavelength-converted.

In general, the wavelengths or colors (including ultraviolet and infrared) of the laser light sources and of the wavelength-converted light are not restricted. In particular, light may be understood as an electromagnetic wave, which include UV light, visible light and IR light, preferably in a spectral range of between 10 nm and 1 mm.

It is a further general refinement that the first light source emits blue light with a peak wavelength of about 445 nm, since this gives high wavelength conversion efficiency. A second light source, the light of which is not wavelength-converted, may emit blue light with a peak wavelength of about 460-470 nm, which permits color emission perceived as purely blue.

For example, blue (445 nm)/green-converted light and/or blue (445 nm)/red-converted light as well as blue (460-470 nm) primary light and/or red primary light, or a combination thereof, may thus be emitted by the luminous device.

Also, for example in the case of the luminous device 11 according to the second embodiment, one or more light-emitting diodes may be used as the second light source 6 instead of the laser light source. At least the luminous region 14 illuminated by the second light source 6 may then be transparent for the light emitted by the second light source 6. Since a light-emitting diode emits relatively widely, the light emitted by the luminous region 14 into the upper half-space OH will thus likewise have a wide light cone. The associated luminous region carrier then advantageously includes at least three luminous regions, namely for example a luminous region for diffuse reflection of the blue light of the first laser light source 5, a luminous region for wavelength conversion of the blue light of the first laser light source 5, and the transparent luminous region 14.

The reflector may, for example, be made of metal or reflectively coated glass.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

LIST OF REFERENCES 1 luminous device
2 luminous region carrier
3 luminous region
4 luminous region
5 first laser light source
6 second laser light source
7 beam combiner
8 reflector
11 luminous device
12 luminous region carrier
13 dichroic mirror
14 luminous region
F focal point of the reflector
L light spot
O upper side of the luminous region carrier
OH upper half-space
U lower side of the luminous region carrier
UH lower half-space
W rotation axis

The invention claimed is:

1. A luminous device, comprising
a luminous region carrier having at least two luminous regions, and at least a first light source configured to emit light of a first color, and a second light source configured to emit light of a second color different from the first color, for respectively illuminating at least one part of the luminous regions, wherein
the first light source is a laser light source,
the luminous region carrier is configured to rotate about an axis relative to the first light source and second light source,
at least one of the luminous regions comprises a luminous material which is configured to be illuminated by the light of the first light source and is configured to re-emit this light at least partially wavelength-converted, and
at least one of the luminous regions is configured to be illuminated by the light of the second light source, the at least one luminous region configured to emit the light at least of the second light source without wavelength conversion.

2. The luminous device as claimed in claim 1, wherein the light of the first light source is scattered on at least one of the luminous regions without wavelength conversion.

3. The luminous device as claimed in claim 1, wherein at least one luminous region scatters the light of the second light source without wavelength conversion.

4. The luminous device as claimed in claim 1, wherein the light of the light sources is shone onto the same side of the luminous region carrier.

5. The luminous device as claimed in claim 1, wherein at least one of the luminous regions is a luminous region which is diffusely reflective for the light of the second light source.

6. The luminous device as claimed in claim 1, wherein the light of the two light sources is shone onto different sides of the luminous region carrier, and wherein at least one of the luminous regions is a luminous region which is optically transmissive for the light of the second light source.

7. The luminous device as claimed in claim 6, wherein the second light source is a narrow-emitting light source, and the at least one of the luminous regions is a luminous region which scatters the light of the second light source.

8. The luminous device as claimed in claim 6, wherein the second light source is a wide-emitting light source, and the at least one of the luminous regions is a luminous region which is transparent for the light of the second light source.

9. The luminous device as claimed in claim 6, wherein the luminous region which is optically transmissive for the light of the second light source is a luminous region which wavelength-converts the light of the first light source.

10. The luminous device as claimed in claim 6, wherein a mirror which is transmissive for the light coming from the second light source and non-transmissive for the light coming from the first light source is arranged in a light path between the second light source and the luminous region which is optically transmissive for the light of the second light source.

11. The luminous device as claimed in claim 1, wherein the at least two luminous regions are divided between at least two concentric annular regions on the luminous region carrier.

12. The luminous device as claimed in claim 1, wherein the light of the second light source comprises red light.

13. The luminous device as claimed in claim 1, wherein the light of the first light source comprises blue light and/or ultraviolet light.

14. The luminous device as claimed in claim 1, wherein the luminous device comprises at least one reflector arranged optically downstream of the luminous region carrier and a light emission surface, produced by the light sources, of the luminous regions, is located in or at a focal point of the at least one reflector.

15. The luminous device as claimed in claim 14, wherein the at least one reflector has a plurality of focal points, and wherein light emission surfaces, produced by different light sources, of the luminous regions are located in or at different focal points of the at least one reflector.

16. The luminous device as claimed in claim 1 wherein at least one of the first light source and/or the second light source is configured to produce a light spot defining an area of illumination smaller than the area of the luminous region carrier.

17. The luminous device as claimed in claim 16 wherein the light spot progressively illuminates a portion of at least one of the two luminous regions during rotation of the luminous region carrier.

18. The luminous device as claimed in claim 17 wherein thermal stresses on the luminous region carrier is reduced due to the progressive illumination of the luminous region during rotation of the luminous region carrier.

* * * * *

UNITED STATES PATENT AND TRADEMARK OFFICE
CERTIFICATE OF CORRECTION

| | | |
|---|---|---|
| PATENT NO. | : 9,169,993 B2 | Page 1 of 1 |
| APPLICATION NO. | : 13/982762 | |
| DATED | : October 27, 2015 | |
| INVENTOR(S) | : Klaus Finsterbusch | |

It is certified that error appears in the above-identified patent and that said Letters Patent is hereby corrected as shown below:

IN THE SPECIFICATION

Column 1, line 10: Please delete the heading "Technical Fileld" and write "BACKGROUND" in place thereof.

Column 1, line 22: Please delete the heading "Background" and write "BRIEF DESCRIPTION" in place thereof.

Column 7, line 28: Please move the heading "BRIEF DESCRIPTION OF THE DRAWINGS" from line 28 to line 22.

Signed and Sealed this
Twenty-ninth Day of March, 2016

Michelle K. Lee
*Director of the United States Patent and Trademark Office*